United States Patent Office 3,095,435
Patented June 25, 1963

3,095,435
ALKALI-METAL-ETHER COMPLEX SALTS OF A GROUP VIB METAL PENTACARBONYL IODIDE
Raymond E. Maginn, Detroit, Mich., assignor to Ethyl Corporation, New York, N.Y., a corporation of Virginia
No Drawing. Filed Apr. 11, 1961, Ser. No. 102,122
20 Claims. (Cl. 260—438)

This invention relates to novel organometallic compounds. More specifically, the invention relates to ionic compounds of chromium containing a chromium pentacarbonyl iodide anion which is bonded to a cation. The ionic compound is stabilized by the presence of certain specified ethers or ketones in the molecule. Also included in my invention is a method for making the above mentioned compounds.

An object of this invention is to provide novel organometallic compounds of chromium. A further object is to provide compounds in which a cation is bonded to a chromium pentacarbonyl iodide anion which compound is stabilized by the presence of specified ethers or ketones in the molecule. An additional object is to provide a method for making the above mentioned compounds. Still further objects will become apparent from the following discussion and claims.

The objects of my invention are accomplished by reacting an iodide salt with chromium hexacarbonyl in the presence of a specified solvent. Applicable iodide salts which may be employed in forming my novel compounds are alkali metal-iodide salts such as sodium iodide, potassium iodide, lithium iodide, rubidium iodide, and cesium iodide. Also, I can employ ammonium-iodide salts in forming my compounds. As an example, I can use ammonium iodide itself.

As stated previously, the reaction is carried out in the presence of a specified solvent. The nature of the solvent is quite critical to the success of the reaction. The most preferred solvents for use in my process are the tridentate, non-cyclic ethers such as diethyleneglycol dimethylether, diethyleneglycol diethylether, diethyleneglycol dipropylether, and dipropyleneglycol diethylether. When employing tridentate non-cyclic ethers as the solvent, the time required for reaction is decreased which materially adds to the success of the process.

Another class of solvents which I can employ in my reaction are the bidentate non-cyclic ethers such as dimethoxy ethane, diethoxy ethane, dipropoxy propane, and the like. These solvents also stabilize the ionic compound formed between a cation and a chromium pentacarbonyl iodide anion. However, their use requires longer reaction times than required when using a non-cyclic tridentate ether solvent.

Still another class of solvents which I may employ in my reaction are cyclic and acyclic aliphatic hydrocarbon ketones such as cyclopentanone and diethyl ketone which have a normal boiling point ranging from about 60 to about 200° C. The ketone solvent is not as desirable as the bidentate non-cyclic ethers or the tridentate non-cyclic ethers, as enumerated above, since the ketone is less capable of stabilizing the ionic compound which is formed.

The specificity of my products and the processes by which they are produced is illustrated by the fact that attempted reaction between chloride or bromide salts and chromium hexacarbonyl in the presence of a tridentate non-cyclic ether using the same conditions as employed with the iodide salts led only to decomposition. Thus, the use of chloride or bromide salts in my process is excluded and is not within the scope of my invention.

The compounds produced by my process are quite unique and differ markedly from conventional etherates. In a conventional etherate, the ether is bound loosely within the molecule such that it is easily removed. In contrast, the ether or ketone present in my ionic compounds is firmly bound within the molecule so that it cannot be easily removed. As an example, I have found that my compounds can be recrystallized from ethers which are not the same as the complexed ether without removal of the complexed ether. To illustrate, the compound sodium bis(diethyleneglycol dimethylether) chromium pentacarbonyl iodide can be recrystallized from diethylether without removal of the complexed diethyleneglycol dimethylether. Also, the compound potassium tris(diethyleneglycol dimethylether) chromium pentacarbonyl iodide can be recrystallized from diethylether without loss of the complexed diethyleneglycol dimethylether.

My compounds can be depicted as having the following generic formula:

$$M(Y)_xCr(CO)_5I$$

in which M is a cation as previously described, Y is a tridentate non-cyclic ether, a bidentate non-cyclic ether or a ketone as previously described, and $x$ is an integer ranging from one to five. Preferably, $x$ is an integer ranging from two to three. Examples of my complexes in the above defined formula are potassium tris(diethyleneglycol dimethylether) chromium pentacarbonyl iodide, sodium bis(diethyleneglycol dimethylether) chromium pentacarbonyl iodide, ammonium tris(diethyleneglycol dimethylether) chromium pentacarbonyl iodide, and sodium tris(dimethoxy ethane) chromium pentacarbonyl iodide.

My ionic compounds are formed by reacting an appropriate iodide salt such as sodium iodide, potassium iodide, lithium iodide, or ammnium iodide with chromium hexacarbonyl in the presence of a specified ether or ketone solvent, both as described above. My process is preferably carried out in the presence of an inert atmosphere such as nitrogen, argon, krypton, neon, or the like. Preferably, nitrogen is used as the inert atmosphere since it is cheaper and more plentiful than other of the enumerated inert gases. The reaction temperature is not critical but preferably ranges from about 80° C. to about 200° C.

My process is normally conducted at atmospheric pressure but may be conducted at higher pressures if desired. In the event that the ether solvent is relatively low boiling, it may be advantageous to carry the reaction out under pressure since this enables the use of higher temperatures without solvent loss. During my process, I preferably agitate the reaction mixture since this affords a more even reaction rate, a shorter reaction time, and facilitates removal of carbon monoxide from the reaction mixture. The relative quantities of reactants employed are not critical. An excess of either the chromium hexacarbonyl or the iodide salt may be used if desired. The ether or ketone reactant is employed in the reaction in a large excess, i.e., in solvent quantities. The time required for the reaction is determined by the other reaction variables employed. Thus, an increase in the reaction temperature and an increase in the degree of agitation will cause a proportionate decrease in the reaction time which is required. In practice, it is not difficult to determine the reaction time with reasonable accuracy. This is done by determining the amount of gas evolved from the reaction mixture. When a quantity of gas is evolved which is equal to the displacement of one equivalent of carbon monoxide from the chromium hexacarbonyl reactant, this shows that the reaction is essentially complete.

The products of my reaction are, in general, solids which are crystalline in nature. They are readily separated from the reaction mass by conventional means such as crystallization followed by filtration. To further illustrate the scope of my process and the products produced thereby, there are presented the following examples in which all parts and percentages are by weight unless otherwise indicated.

*Example I*

A mixture comprising 4.2 grams of potassium iodide, 5.5 grams of chromium hexacarbonyl, and 150 mls. of 3-pentanone was heated under nitrogen at reflux for nine hours. At the end of this time, one equivalent of carbon monoxide had been displaced from the chromium hexacarbonyl reactant. After filtering the reaction mixture to remove unreacted potassium iodide, solvent was removed at reduced pressure from the red filtrate. The resulting red oily semi-solid was recrystallized from diethyl ether to yield 6.8 grams of a potassium-diethyl ketone-chromium pentacarbonyl iodide salt in the form of red-orange crystals which were somewhat thermally unstable.

To a solution containing 0.5 gram of the red-orange crystalline product in 50 mls. of absolute ethanol was added 16 mls. of ethanol containing 0.0007 gram-mole of tris(o-phenanthroline)-nickel (II) chloride. After stirring for one hour under nitrogen at room temperature, the reaction mixture was filtered and there was obtained 1.0 gram of yellow solids which were crystallized from an acetone-petroleum ether solvent mixture. On analysis of the yellow solid product there was found: C, 45.3; H, 2.19; N, 7.1; Ni, 4.72; Cr, 8.1; I, 23.4 percent. Calculated for tris(o-phenanthroline)-nickel (II) bis(chromium pentacarbonyl iodide), $C_{46}H_{24}N_6O_{10}Cr_2$: C, 44.6; H, 1.94; N, 6.8; Ni, 4.77; Cr, 8.4; I, 20.5 percent. On the basis of this analysis it was established that the anionic portion of the red-orange crystalline product, a potassium-diethyl ketone-chromium pentacarbonyl iodide, was, in fact, chromium pentacarbonyl iodide.

When Example I is repeated using other ketone solvents than 3-pentanone, similar results are obtained. Thus, the use of methyl ethyl ketone, cyclopentanone, and diisopropyl ketone gave products analogous to that obtained using 3-pentanone.

*Example II*

A mixture comprising 5.5 grams of chromium hexacarbonyl, 4.2 grams of potassium iodide and 100 mls. of diethyleneglycol dimethylether were heated to reflux under nitrogen. At or slightly before reflux, a very vigorous reaction began as evidenced by considerable foaming and rapid gas evolution. After refluxing for 15 minutes, the vigorous reaction subsided considerably. After continued heating at reflux until 800 mls. of gas had been evolved from the reaction mixture (this was slightly more than the calculated quantity for one equivalent of carbon monoxide which was 500 mls.), the reaction mixture was cooled and filtered. The orange-red filtrate was evaporated to dryness at reduced pressure and the resulting residue was taken up in diethyl ether and filtered. After removing most of the diethyl ether, petroleum ether was added which precipitated 9.5 grams of yellow solids. The crude product was then recrystallized several times from diethyl ether to yield a purified yellow compound which melted at 102–105° C. and was stable in air for several hours. The compound was soluble in water, diethyl ether, and ethanol, but insoluble in petroleum ether and n-hexane.

The infrared spectrum of this material showed metallocarbonyl bands at 4.9, 5.2, and 5.4 microns and diethyleneglycol dimethylether bands at 9.0 and 9.2 microns. On analysis there was found: C, 36.3; H, 5.59; K, 5.87; Cr, 7.32; I, 16.6 percent. Calculated for potassium tris-(diethyleneglycol dimethylether) chromium pentacarbonyl iodide, $C_{23}H_{42}O_{14}CrKI$: C, 36.3; H, 5.53; K, 5.14; Cr, 6.85; I, 16.7 percent.

When Example II is repeated using ethers other than diethyleneglycol dimethylether such as diethyleneglycol diethylether, diethyleneglycol dibutylether, and dipropyleneglycol dimethylether, there is obtained potassium tris-(diethylene glycol diethylether) chromium pentacarbonyl iodide, potassium tris(diethyleneglycol dibutylether) chromium pentacarbonyl iodide, and potassium tris(dipropyleneglycol dimethylether) chromium pentacarbonyl iodide.

*Example III*

A mixture comprising 5.5 grams of chromium hexacarbonyl, 3.7 grams of sodium iodide and 60 mls. of 1,2-dimethoxy ethane was heated at reflux under nitrogen for 7.5 hours during which time one equivalent of carbon monoxide was evolved from the reaction mixture. The dark colored reaction mixture was then cooled and filtered. Low boiling petroleum ether was then added to the orange-red filtrate to precipitate 12.5 grams of crude yellow product. The product was recrystallized from diethyl ether containing small amounts of petroleum ether. The product was then separated by filtration followed by drying. At room temperature, the product darkened within a short time but it could be stored indefinitely in the refrigerator without decomposition even in the presence of air. The product was soluble in diethyl ether, ethanol, and water, but insoluble in petroleum ether. On analysis there was found: C, 32.7; H, 4.95; Cr, 8.71; Na, 3.87; I, 25.1 percent. Calculated for tris(1,2-dimethoxy ethane) sodium chromium pentacarbonyl iodide, $C_{17}H_{30}O_{11}CrNaI$: C, 33.3; H, 4.91; Cr, 8.5; Na, 3.76; I, 20.8 percent. On the basis of the analytical results, the product was determined to be sodium tris(1,2-dimethoxy ethane) chromium pentacarbonyl iodide.

When Example III is repeated using 1,2-diethoxy ethane, 1,3-dipropoxy butane, and 1,3-dimethoxy propane in place of 1,2-dimethoxy ethane, there is obtained sodium tris(1,2-diethoxy ethane) chromium pentacarbonyl iodide, sodium tris(1,3-dipropoxy butane) chromium pentacarbonyl iodide, and sodium tris(1,3-dimethoxy propane) chromium pentacarbonyl iodide.

*Example IV*

A mixture comprising 5.5 grams of chromium hexacarbonyl, 3.8 grams of sodium iodide and 100 ml. of diethyleneglycol dimethylether was heated to reflux under nitrogen, whereupon a vigorous reaction began and lasted for about 10 to 15 minutes. After cooling the reaction mixture and filtering, petroleum ether was added to the orange-red filtrate, thereby precipitating 11 grams of an orange solid. The solid was recrystallized from diethyl ether to give an orange crystalline product. The infrared spectrum of the product was substantially identical to that of the potassium tris(diethyleneglycol dimethylether) chromium pentacarbonyl iodide as prepared in Example II. On analysis, there was found: C, 33.1; H, 4.83; Cr, 8.45; I, 22.9; Na, 3.92 percent. Calculated for sodium bis(diethyleneglycol dimethylether) chromium pentacarbonyl iodide, $C_{17}H_{28}O_{11}CrNaI$: C, 33.5; H, 4.59; Cr, 8.53; I, 20.8; Na, 3.77 percent. On the basis of its infrared spectrum and elemental analysis, the product was clearly identified as sodium bis(diethyleneglycol dimethylether) chromium pentacarbonyl iodide.

On repetition of Example IV employing calcium iodide in place of sodium iodide, there is obtained the corresponding calcium-diethyleneglycol dimethylether chromium pentacarbonyl iodide compound. Likewise, reaction of calcium iodide with chromium hexacarbonyl in 1,2-dimethoxy ethane solvent produces the corresponding calcium-1,2-dimethoxy ethane chromium pentacarbonyl iodide. This illustrates the scope of my invention and its application in forming alkaline earth metal-ether chromium pentacarbonyl iodide compounds.

*Example V*

A mixture comprising 5.5 grams of chromium hexacarbonyl, 3.6 grams of ammonium iodide and 100 mls. of diethyleneglycol dimethylether was heated at reflux under nitrogen for 20 minutes. There was evolved 685 mls. of gas, which was slightly more than the 560 mls. required for the evolution of an equivalent of carbon monoxide and a deep red solution was obtained. Approximately 50 mls. of the diethyleneglycol dimethylether were removed by heating the reaction product at reduced pressure. Petroleum ether was then added to precipitate yellow solids. These were filtered and recrystallized from diethyl ether to give bright orange-yellow crystals having a melting point of 71–73° C. The product was soluble in water, ethanol, and diethyl ether, but insoluble in petroleum ether. It was somewhat unstable in air but was quite stable when kept cold. On analysis there was found: C, 37.4; H, 6.24; N, 2.07; Cr, 7.1; I, 18.5 percent. Calculated for ammonium tris(diethyleneglycol dimethylether) chromium pentacarbonyl iodide,

C, 37.4; H, 6.23; N, 1.9; Cr, 7.05; I, 7.2 percent. On the basis of its elemental analysis the compound's identity was clearly established as ammonium tris(diethyleneglycol dimethylether) chromium pentacarbonyl iodide.

When Example V is repeated using diethyleneglycol dipropylether, dipropyleneglycol dimethylether, and diethyleneglycol diethylether in place of the diethyleneglycol dimethylether, there is obtained ammonium tris(diethyleneglycol dipropylether) chromium pentacarbonyl iodide, ammonium tris(dipropyleneglycol dimethylether) chromium pentacarbonyl iodide, and ammonium tris(diethyleneglycol diethylether) chromium pentacarbonyl iodide in good yield. Also, the reaction goes well when a non-cyclic bidentate ether such as 1,2-dimethoxy ethane is employed.

As shown by the preceding examples, my invention provides a variety of alkali metal and ammonium salts of chromium pentacarbonyl iodide. In each case the salt is stabilized by a non-cyclic tridentate ether, a non-cyclic bidentate ether, or an aliphatic hydrocarbon ketone which preferably has a normal boiling point in the range from about 60 to about 200° C. Unlike well-known etherates of the prior art, the non-cyclic tridentate ether, non-cyclic bidentate ether, or aliphatic hydrocarbon ketone present in my compounds is an integral part of the compounds and is not easily removed therefrom. Thus, my compounds can be crystallized from an ether solvent without loss of the complexed ether.

A utility for my compounds is as chemical intermediates. In this use, my compounds can be employed in the formation of other useful products which, in turn, can be converted to well-known organic compounds. To illustrate, there is presented the following example in which all parts and percentages are by weight unless otherwise indicated.

*Example VI*

A mixture comprising 5.5 grams of chromium hexacarbonyl, 4.2 grams of potassium iodide and 100 mls. of diethyl ketone (3-pentanone) was heated at reflux under nitrogen for approximately 4¼ hours after which the reaction product was cooled and a deep-red solution was obtained. Solvent was removed at reduced pressure to give a deep-red oil which was a potassium-diethyl ketone chromium pentacarbonyl iodide complex. To the deep-red oil was added 50 mls. of chlorobenzene and 25 mls. of 3-pentanone. The mixture was refluxed for 30 minutes and after cooling was filtered. There was obtained a yellow solution which was evaporated to yield 0.7 grams of chlorobenzene chromium tricarbonyl.

The chlorobenzene chromium tricarbonyl, as produced in the preceding example, is a valuable chemical intermediate which can be utilized in the preparation of organic compounds. As set forth in copending application Serial No. 4,018, filed January 22, 1960, chlorobenzene chromium tricarbonyl can be reacted with sodium methoxide to produce anisole chromium tricarbonyl. This compound can be cleaved by reaction with pyridine or carbon monoxide to yield anisole which is a well recognized organic compound having a variety of utilities such as in perfumery and in killing lice.

A further use for my compounds is in metal plating. In this application, the compounds are thermally decomposed in an atmosphere of a reducing gas such as hydrogen or a neutral atmosphere such as nitrogen to form a metal-containing film on a substrate material. The substrate material can be heated above the decomposition temperature of the compound and brought into contact with the compound. Another way of applying the film to the substrate material is to lightly coat the substrate material with the compound after which the coated substrate is heated to a temperature above the decomposition temperature of the compound.

The metal-containing films which are formed from my compounds have a wide variety of applications and may be used in forming conductive surfaces such as employed in a printed circuit, in producing a decorative effect on a substrate material or in forming a corrosion-resistant coating on a substrate material. A still further utility for my compounds is as catalysts in the preparation of organic compounds.

Having fully defined the novel compounds of my invention, their mode of preparation and their many utilities, I desire to be limited only within the scope of the appended claims.

I claim:

1. Compounds having the generic formula:

$$M(Y)_xCr(CO)_5I$$

in which M is selected from the group consisting of alkali metal and ammonium cations, Y is selected from the group consisting of tridentate non-cyclic ethers, bidentate non-cyclic ethers and aliphatic hydrocarbon ketones, and $x$ is an integer ranging from 2 to 3.

2. The compounds of claim 1 in which M is a sodium cation.

3. The compounds of claim 1 in which M is a potassium cation.

4. The compounds of claim 1 in which M is an ammonium cation.

5. The compounds of claim 1 in which Y is a tridentate non-cyclic ether.

6. The compounds of claim 5 in which Y is diethyleneglycol dimethylether.

7. The compounds of claim 1 in which Y is a bidentate non-cyclic ether.

8. The compounds of claim 7 in which Y is 1,2-dimethoxy ethane.

9. Potassium tris(diethyleneglycol dimethylether) chromium pentacarbonyl iodide.

10. Sodium tris(1,2-dimethoxy ethane) chromium pentacarbonyl iodide.

11. Sodium bis(diethyleneglycol dimethylether) chromium pentacarbonyl iodide.

12. Ammonium tris(diethyleneglycol dimethylether) chromium pentacarbonyl iodide.

13. Process for the preparation of the compounds of claim 1 said process comprising reacting chromium hexacarbonyl with an iodide salt selected from the group consisting of alkali metal iodides and ammonium iodide in the presence of a solvent-reactant selected from the group consisting of non-cyclic tridentate ethers, non-cyclic bidentate ethers, and aliphatic hydrocarbon ketones.

14. The process of claim 13 in which the iodide salt is sodium iodide.

15. The process of claim 13 in which the iodide salt is potassium iodide.

16. The process of claim 13 in which the iodide salt is ammonium iodide.

17. The process of claim 13 in which the solvent is a non-cyclic tridentate ether.

18. The process of claim 17 in which the solvent is diethyleneglycol dimethylether.

19. The process of claim 13 in which the solvent is a non-cyclic bidentate ether.

20. The process of claim 19 in which the solvent-reactant is 1,2-dimethoxy ethane.

References Cited in the file of this patent

UNITED STATES PATENTS

| | | |
|---|---|---|
| 2,870,183 | Brantley | Jan. 20, 1959 |
| 2,885,417 | Heyden | May 5, 1959 |

OTHER REFERENCES

J. Chem. Soc., July 1959, p. 2323.

Karrer, "Organic Chemistry," New York, 1938, pp. 105–106, Bookcase VII.